United States Patent [19]

Kondo et al.

[11] 4,170,438
[45] Oct. 9, 1979

[54] FLUID PUMP WITH A CONTINUOUSLY VARIABLE SPEED CONVERTER

[75] Inventors: Yukio Kondo, Toyota; Minoru Kawabata, Aichi; Mikio Suzuki, Hekinan, all of Japan

[73] Assignees: Toyoda-Koki Kabushiki-Kaisha; Toyota Jidosha Kogyo Kabushiki Kaisha, both of Aichi, Japan

[21] Appl. No.: 843,667

[22] Filed: Oct. 19, 1977

[30] Foreign Application Priority Data

Oct. 22, 1976 [JP] Japan .................. 51/127649

[51] Int. Cl.² .......................... F04B 49/00
[52] U.S. Cl. ...................... 417/223; 74/200
[58] Field of Search ............. 417/15, 34, 47, 223, 417/319; 74/200; 418/133

[56] References Cited

U.S. PATENT DOCUMENTS

| | | | |
|---|---|---|---|
| 2,009,001 | 7/1935 | Peterson | 417/223 |
| 2,493,341 | 1/1950 | Corey | 417/223 |
| 2,933,129 | 4/1960 | Wright | 417/47 X |
| 3,248,960 | 5/1966 | Schottler | 74/200 |
| 3,311,064 | 3/1967 | Eichele et al. | 418/133 |
| 3,596,467 | 8/1971 | Avery | 74/200 X |
| 3,645,654 | 2/1972 | Niemiec et al. | 418/133 |
| 3,653,272 | 4/1972 | Scheiter | 74/200 X |

FOREIGN PATENT DOCUMENTS 101783 8/1937 Australia .................. 417/223

Primary Examiner—Carlton R. Croyle
Assistant Examiner—Edward Look
Attorney, Agent, or Firm—Oblon, Fisher, Spivak, McClelland & Maier

[57] ABSTRACT

A continuously variable speed converter is incorporated in a main housing of a fluid pump and is drivingly connected at an output shaft thereof to a pump rotor so as to transmit the driving power of an engine to the pump rotor at various output/input speed ratios. An actuator is operatively connected at its piston to a speed change mechanism of the speed converter and is responsive to pressurized fluids, which are delivered from the pump, respectively, through and not through a throttle element provided on an outlet passage of the pump. The piston is biased by means of a spring to operate the speed change mechanism to maintain constant the pressure difference between fluids before and behind the throttle element, so that fluid may be delivered from the pump approximately at a predetermined flow rate regardless of changes in engine rotational speed.

5 Claims, 5 Drawing Figures

FLUID PUMP WITH A CONTINUOUSLY VARIABLE SPEED CONVERTER

BACKGROUND OF THE INVENTION

1. Field of the Invention

The present invention relates generally to a fluid pump driven by an engine of a motor vehicle and, more particularly, to such a fluid pump incorporating a continuously variable speed converter therein.

2. Description of the Prior Art

It is desirable to maintain constant the flow volume of fluid delivered from a fluid pump driven by an engine of a motor vehicle to power actuators, such as power steering. For this purpose, there has heretofore been utilized a flow volume control valve which serves to cause a surplus volume of fluid to flow back to a suction area of the pump when the same delivers pressurized fluid beyond a predetermined volume. However, the provision of the control valve does not effect decreasing the flow volume of fluid delivered from the pump itself, thus resulting in great power consumption of the engine by the pump. Particularly, the power consumption by the pump is extreme when great load acts on the pump. This not only brings about engine power loss to increase fuel costs, but also significantly increases the temperature of the working oil to accelerate deterioration in the quality of the working oil.

In order to solve these drawbacks, there has also been suggested an improved pump drive mechanism, in which, as disclosed in U.S. Pat. No. 3,653,272 to M. H. Scheiter, a continuously variable speed converter is utilized to transmit the driving power of an internal combustion engine to a fluid pump at various output/input speed ratios. The mechanism is further provided with an "internal sensing" ratio control means which senses changes in fluid force, reflecting changes in input speed, so as to control the output/input speed ratio. Since the change in fluid force is effected under the action of centrifugal force when a housing containing a predetermined volume of fluid is rotated and since the centrifugal force changes in proportion to the 2nd power of the rotational speed of the housing, the output/input ratio does not have a linear proportional relation with the rotational speed. Accordingly, even using the mechanism, the volume of fluid from the pump cannot be accurately maintained at a constant value.

SUMMARY OF THE INVENTION

It is therefore an object of the present invention to provide an improved fluid pump with a continuously variable speed converter which is capable of maintaining the flow volume of fluid delivered from itself constant regardless of changes in the rotational speed of an engine.

Another object of the invention is to provide an improved fluid pump of the character set forth herein, wherein the output/input speed ratio of a continuously variable speed converter is controlled in an approximately linear proportional relation with the rotational speed of an engine.

Still another object of the invention is to provide an improved fluid pump of the character set forth herein which integrally incorporates therein a continuously variable speed converter to thereby occupy only little mounting space.

A further object of the invention is to provide an improved fluid pump of the character set forth herein, which is capable of preventing slip between the input and output shafts of a continuously variable speed converter.

Briefly, according to the present invention, there is provided a fluid pump driven by an engine and free from a flow volume control valve, which pump comprises, in combination, a main housing having an outlet passage, a pump casing and pump rotor provided in the main housing and cooperating with each other for delivering fluid to the outlet passage, a continuously variable speed converter provided in the main housing and drivingly connected at an output shaft thereof to the pump rotor for transmitting rotational driving power of the engine to the pump rotor at various output/input speed ratios, a throttle element provided on the outlet passage, an actuator having a movable member, a speed change mechanism incorporated in the speed converter for changing the transmission ratio of the driving power from the engine to the pump rotor and operatively connected to the movable member so as to be controllably operated thereby, and means cooperating with the actuator.

The movable member is responsive to pressurized fluids which are delivered from the pump, respectively, through and not through the throttle element. The means cooperating with the actuator operates the speed change mechanism to maintain constant the pressure difference between the fluids before and behind the throttle element, whereby the volume of fluid delivered from the pump may be maintained approximately constant irrespective of changes in the rotational speed of the engine.

BRIEF DESCRIPTION OF THE DRAWINGS

Various other objects, features and attendant advantages of the present invention will be readily appreciated as the same becomes better understood from the following detailed description of a preferred embodiment, when considered in connection with the accompanying drawings, in which.

DETAILED DESCRIPTION OF A PREFERRED EMBODIMENT

Figure 1:
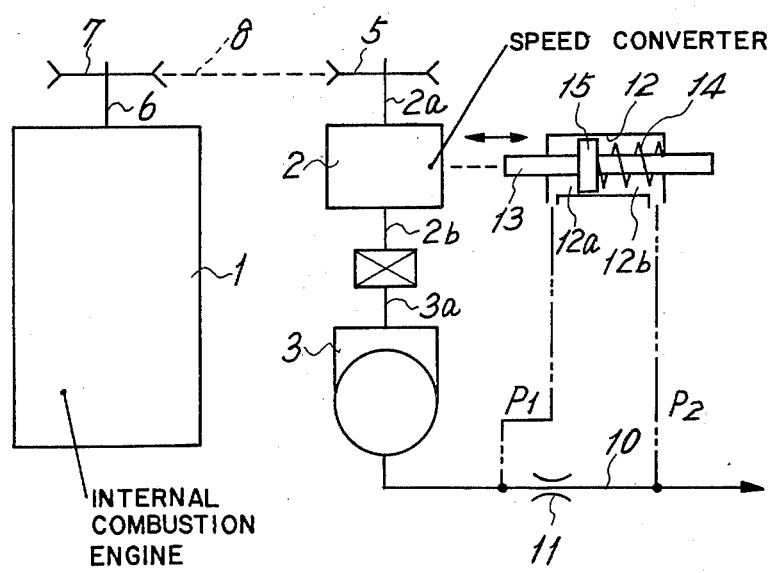
FIG. 1 is an explanatory view showing the principle configuration of a driving system of a fluid pump according to the present invention.

Referring now to the drawings, wherein like reference numerals designate like or corresponding parts throughout the several views, and particularly to FIG. 1 thereof, there is shown a principle configuration of the present invention which comprises an internal combustion engine 1 of a motor vehicle, a stepless or continuously variable speed converter 2 and a fluid pump 3. The speed converter 2 is disposed in axial alignment with the pump 3 and is connected at its output shaft 2b to a pump shaft 3a of the pump 3. An input shaft 2a of the speed converter 2 has fixed thereon a driven pulley 5, which is in driving connection with a drive pulley 7, keyed on an engine rotational shaft 6, through a belt 8. The pump 3 is of the constant capacity type and itself is free from a flow volume control valve as used in the prior apparatus. A throttle 11 is provided on an outlet passage 10 of the pump 3, and pressurized fluids before and behind the throttle 11 are introduced into left and right chambers 12a, 12b of a cylinder 12. A piston rod 13 of a piston 15 contained in the cylinder 12 is operatively connected to a speed change mechanism, referred to later, of the speed converter 2 and controls the output/input speed ratio in response to the difference between pressures generated before and behind the throttle 11. Provided in the right chamber 12b, acting as a low pressurized chamber, is a compression spring 14, which urges the speed change mechanism to operate in such a direction as to increase output rotation of the converter 2 relative to the input rotation thereof. It is apparent that the spring 14 is not necessarily provided in the cylinder 12.

Assuming now that the spring constant of the spring 14 is K, the force of the spring 14, when having a deflection $\delta$, is expressed as $F = K \cdot \delta$. Assuming further that pressures being generated before and behind the throttle 11, are respectively, P1 and P2 and that the piston 15 has an effective area S at each of the right and left sides thereof, when $S \cdot (P1 - P2) = F$, the forces acting on the right and left sides of the piston 15 balance each other. Also, assuming that the pressure difference effected between fluids before and behind the throttle 11 in this situation is P, the following relationship comes into existence, $$\Delta P = P1 - P2 = K \cdot \delta / S$$

and the pressure difference $\Delta P$ is therefore in a proportional relation with the deflection $\delta$ of the spring 14. Accordingly, at the occurrence of changes in the pressure difference $\Delta P$, the piston 15 is moved to deflect the spring 14 in correspondence to such changes in the pressure difference $\Delta P$ and, at the same time, operates the speed change mechanism to automatically control the output/input speed ratio, so as to thereby maintain constant the pressure difference $\Delta P$ between fluids before and behind the throttle 11. As a result, the flow volume of fluid delivered to the outlet passage 10 via the throttle 11 can be maintained approximately constant. Such output/input speed ratio control of the converter 2 is cooperated with the after described pressuring control, which is based upon pump load, so as to maintain the pump rotational speed approximately constant, and it results from this that a predetermined flow volume of fluid may be delivered from the pump 3.

An example embodying the principle of the present invention shown in FIG. 1 will hereinafter be described, with reference to FIG. 2. An enlarged bore 21 and a bore 22, respectively containing a continuously variable speed converter T and pump components P, are formed in a main housing 20 in axial alignment with each other. The converter T in the enlarged bore 21 comprises a pair of friction discs 23 and 24 disposed in face-to-face relation, a plurality of balls 25, preferably being four in number, rolling in contact with guide ways 23a and 24a formed on the friction discs 23 and 24, a plurality of rollers 26, also preferably four in number, for holding the balls 25 in contact with the guide ways 23a and 24a and capable of tilting the rotational axes of the balls 25 in respective planes, each including the axis of an input shaft 28, and a retaining case 27 pivotably carrying support shafts 26a of the rollers 26. The input shaft 28, protruding from the friction disc 23, is rotatably carried via a bearing 30 by an end cover 29 secured to one end of the main housing 20 and is restrained from axial movement. An output shaft 31, protruding from the other friction disc 24, is extended into the bore 22 containing the pump components P and is rotatably carried by the main housing 20 through a bearing 32, being allowed axial movement together with the bearing 32. Keyed on the outer end of the input shaft 28 is the driven pulley 5, which is driven through the belt 8 by the drive pulley 7 keyed on the engine rotational shaft 6. The output shaft 31 is formed with a through hole 33 along its longitudinal axis, as well as a spline 34 at its outer surface.

The pump components P in the bore 22 comprise a pump casing 40 having an internal cam bore 40a, a pump rotor 42 mounted on the output shaft 31 through spline engagement and received in the cam bore 40a, a plurality of radially movable vanes 41 retained by the pump rotor 42 and urged to contact with the internal surface of the cam bore 40a, and side plates 43 and 44 respectively being in contact with both side surfaces of the pump casing 40 and the pump rotor 42 disposed therebetween. A cap member 45, closing the open end of the bore 22, is also contained in the housing 20, with a pre-loaded spring 46 interposed between itself and the side plate 44, and is prevented by means of a snap ring 47 from slipping off. A cylinder 48 containing a piston 49 is formed in the cap member 45 in axial alignment with the output shaft 31. The inward open end of the cylinder 48 is closed by a cylindrical sleeve 50, protruding from the side plate 44, by snugly receiving the cylindrical sleeve 50. A cylindrical sleeve 45a, inwardly protruding from the cap member 45, is inserted into the side plate 44 to define a cavity 75, which is communicated with the atmospheric air. The piston 49 is connected to one end of a rod 53, which is extended into the through hole 33 of the output shaft 31 and which is carried by means of bushings 51 and 52 for rotational and axial movement relative to the output shaft 31. The other end of the rod 53 is inserted into the retaining case 27 and is connected to a forked member 54 engaging both side faces of the retaining rollers 26. A compression spring 55 is interposed between the forked member 54 and the retaining case 27 to urge the forked member 54 toward the right, as viewed in FIG. 2.

Figure 4:
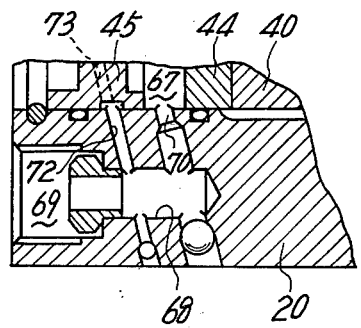
FIG. 4 is a fragmental sectional view illustrative of an outlet passage provided in a main housing of the apparatus.

Fixed on and over the main housing 20 is an oil reservoir 60, from the bottom of which a tubular member 61 is downwardly extended to be inserted into a vertical hole 62 of the main housing 20. This tubular member 61 defines a suction or inlet passage which leads to a pump suction area through an annular passage 63 formed in the housing 20 around the casing 40. A horizontal hole 64 intersecting with the vertical hole 62 allows the oil reservoir 60 to communicate with the enlarged bore 21 containing the speed converter T and admits working oil into the bore 21 to effect lubrication of the parts of the speed converter T. The side plates 44 and 43 are formed as delivery areas, respectively, with an arc through hole 66 and an arc slot 65, which are respectively in fluid communication with a pressure chamber 67 defined between the side plate 44 and the cap member 45 and, via a passage 76, with another pressure chamber, not numbered, defined between the side plate 43 and the main housing 20. Fluid under pressure delivered into the pressure chamber 67 is connected to a delivery or outlet passage 68 formed in the main housing 20, as shown in FIG. 4, to be supplied from an outlet 69 to actuators, such as a power steering, not shown.

Figure 3:
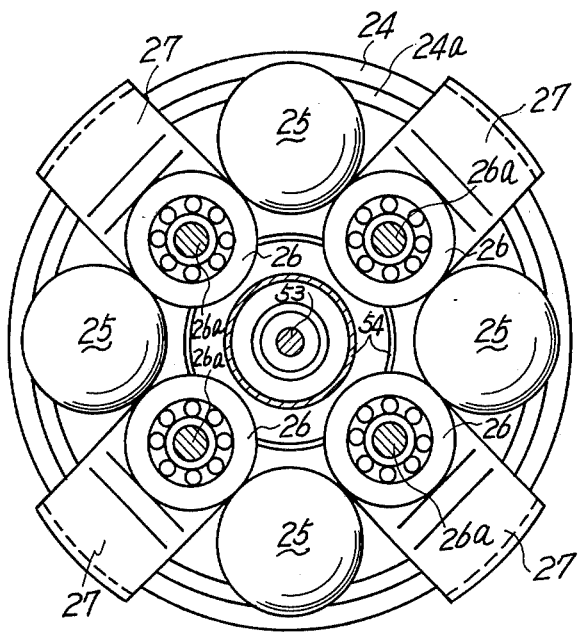
FIG. 3 is a sectional view of the apparatus taken along the line III—III of FIG. 2.

A throttle 70 is formed on the outlet passage 68, and fluids under pressure before and behind the throttle 70 are introduced into the cylinder 48. Specifically, pressurized fluid in the pressure chamber 67 is introduced into the right chamber of the cylinder 48 through a passage 71, while pressurized fluid in the outlet passage 68 behind the throttle 70 is introduced into the left chamber of the cylinder 48 through passages 72 and 73. A pressure force corresponding to the pressure difference between both the pressurized fluids acts on the piston 49 to axially displace the forked member 54, through the rod 53, against the spring 55, and the support shafts 26a of the retaining rollers 26 are thus pivotably moved relative to the retaining case 27. By this, the rotational axes of the balls 25, which are held in contact with the retaining rollers 26 and with the guide ways 23a and 24a of the friction discs 23 and 24, as shown in FIG. 3, are angularly tilted in respective planes, each including the axis of the input shaft 28. When the rotational axes of the balls 25 are parallel with the axis of the input shaft 28, effective radii r1 and r2 at portions of each ball 25 contacting the guide ways 23a and 24a are equal to each other, and a 1:1 output/input speed ratio is obtained. When the rotational axes of the balls 25 are tilted in such a direction as to make the radius r1 larger than the radius r2, the speed change ratio is lowered below 1 to reduce rotation of the output shaft 31. On the other hand, when the rotational axes of the balls 24 are tilted in the opposite direction to make the radius r2 larger than the radius r1, the speed change ratio is heightened above 1 to increase rotation of the outut shaft 31.

The side plates 43 and 44 are pressured toward each other since they receive pump-delivered pressurized fluid at the side surfaces thereof, which are on the opposite side with respect to the other side surfaces being in contact with the pump rotor 42. Since the pressure receiving effective area A of the side plate 44 is designed to be larger than the pressure receiving effective area B of the side plate 43, a differential force, depending upon the difference between the areas A and B, is exerted on the side plate 44, which thus pressures the side plate 43 toward the right, as viewed in FIG. 2, through the casing 40. This differential force is further exerted on the output shaft 31 and the friction disc 24 through the bearing 32 to thereby generate contact pressure between the balls 25 and the guide ways 23a and 24a of the discs 23 and 24. Pre-load contact pressure is generated by means of the spring 46 pressuring the side plate 44. Accordingly, in the situation where no load is acting on the pump, such pre-load contact pressure by means of the spring 46 is effected to transmit rotation of the input shaft 28 to the output shaft 31. Since the pump driving torque in this situation is small, even a weak contact pressure to the guide ways 23a and 24a is sufficient to prevent slip. When the load to the pump is increased, however, the pressure force of fluid against the side plate 44 is strengthened in proportion to the pump load, whereby power transmission may be provided in adaptation to driving torque required by the pump.

Figure 5:
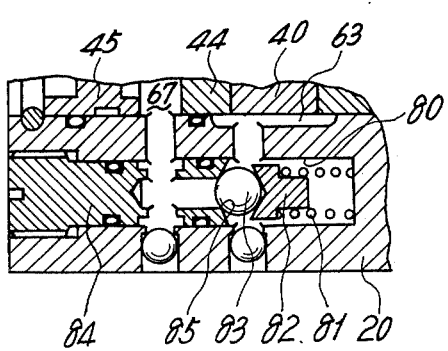
FIG. 5 is a fragmental sectional view illustrative of a relief valve provided in the main housing.

FIG. 5 illustrates a sectional view of a relief valve composed of the main housing 20 providing therein for a communication passage 80, through which the pressure chamber 67 is in fluid communication with the annular passage 63. A spring 81, a spring shoe 82, a ball valve element 83, and a plug 84 offering a valve seat 85 are inserted into the communication passage 80. The relief valve serves to open the ball valve element 83 when load to the pump is heightened above a predetermined value, which is determined by the spring 81, so that pump-delivered fluid may flow back to the suction area of the pump.

The operation of the embodiment as constructed above will hereinunder be described. When the engine 1 is inoperative, no pressure force is exerted on the piston 49 of the cylinder 48, since pressurized fluid is not delivered from the pump. In this situation, the compression spring 55 is effective to displace the forked member 54 and the piston 49 to the rightward end, as viewed in FIG. 2, whereby the support shafts 26a of the retaining rollers 26 are pivoted to such an angular position as to make the output/input speed ratio larger than 1.

When the engine 1 is started, to rotate the input shaft 28 via the pulleys 7 and 5, the output shaft 31 is then rotated at a speed higher than that of the input shaft 28, and pressurized fluid is delivered from the pump. Since the throttle 70 drops the pressure of fluid which flows therethrough into the outlet passage 68, a pressure difference is effected between fluids acting on the right and left sides of the piston 49, which is thus moved together with the forked member 54 toward the left, as viewed in FIG. 2, against the spring 55 to lower the output/input speed ratio. As a result, the volume of fluid delivered from the pump is reduced, to thereby decrease the pressure difference between fluids before and behind the throttle 70. The piston 49 is thereafter stabilized under the condition that a differential force depending upon the pressure difference becomes equal to the force of the spring 55, whereby the output/input speed ratio is automatically controlled until the piston 49 is so stabilized.

When the rotational speed of the engine 1 is increased, the volume of fluid delivered from the pump is also increased to make larger the pressure difference between fluids before and behind the throttle 70, and this results in further moving the piston 49 toward the left against the spring 55. Consequently, decrease of the pump rotational speed is effected to reduce the volume of delivered fluid so as to thereby make the pressure difference smaller, and the output/input speed ratio is further controlled until the piston 49 is again stabilized. In this manner, the rotational speed of the pump is maintained almost constant regardless of great changes in engine rotational speed, so that pressurized fluid may be delivered from the pump at approximately a predetermined flow rate.

Figure 2:
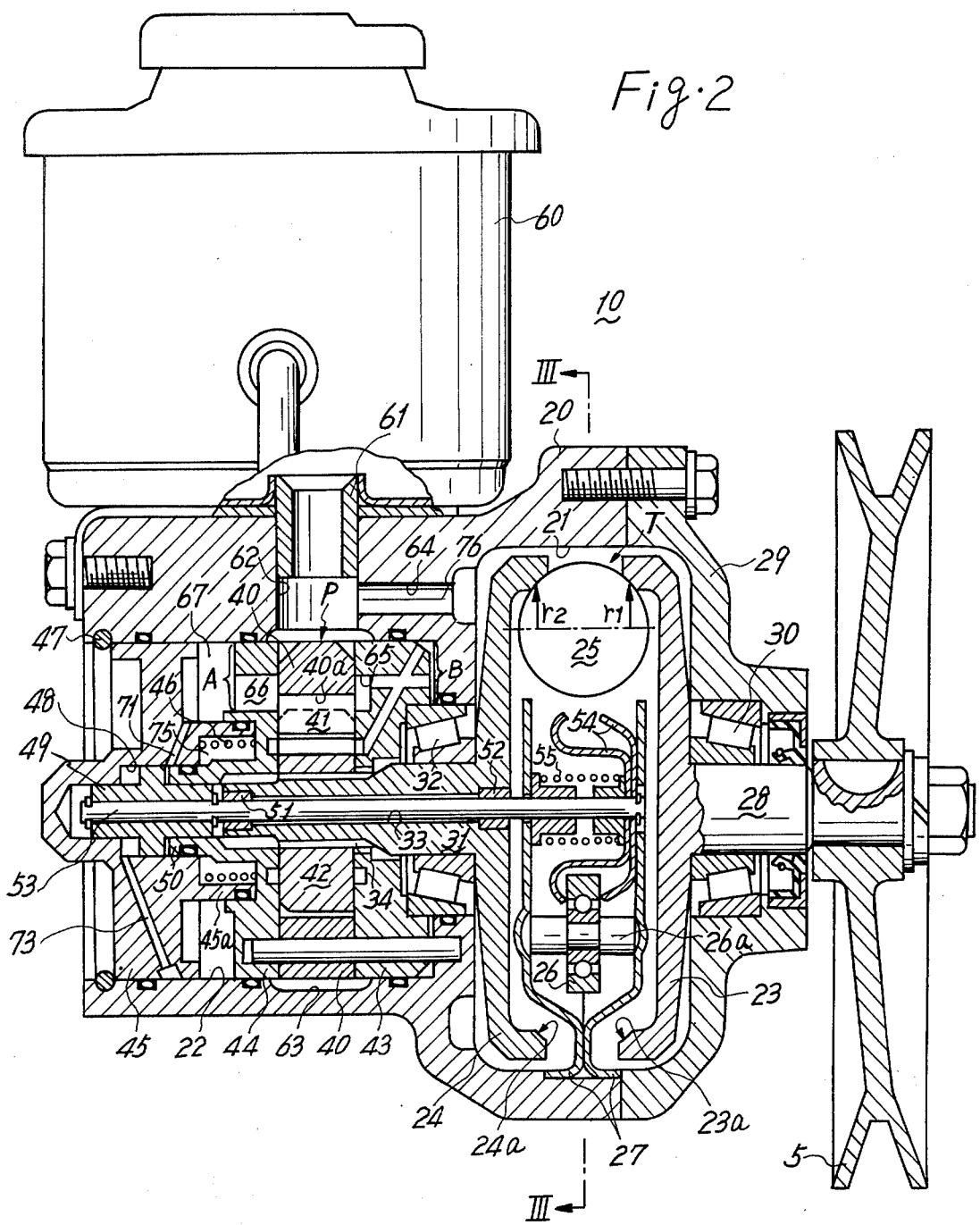
FIG. 2 is a sectional view of a fluid pump with a continuously variable speed converter according to the invention.

Furthermore, pressurized fluid delivered from the pump also acts on the side plates 43 and 44, which because of the difference between the pressure receiving areas A and B thereof, are thus pressured toward the right, as viewed in FIG. 2, so as to apply a pressure force on the output shaft 31 and the friction disc 24 through the bearing 32. Since a contact pressure corresponding to load on the pump is thus generated between the balls 25 and the friction discs 23 and 24, the speed converter T is freed from slip, even when the load to the pump changes.

In a fluid pump according to the present invention, the output/input speed ratio of the speed converter T is automatically controlled in such a manner as to maintain constant the pressure difference between fluids before and behind the throttle 70 regardless of changes in the rotational speed of the engine 1, and, in addition, the speed converter T is prevented from slipping. Accordingly, it is possible to maintain approximately constant the volume of fluid supplied from the outlet passage 68 through the throttle 70. The pump is caused to deliver fluid by a predetermined volume required since it is driven approximately at a predetermined rotational speed, so that power consumption by the pump may be remarkably economized.

Obviously, certain modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fluid pump driven by an engine, comprising:
    a main housing having an outlet passage;
    a continuously variable speed converter provided in said main housing and composed of input and output shafts rotatably carried by said main housing in axial alignment with each other and of a pair of friction discs provided respectively on said input and output shafts in face-to-face relation for frictionally transmitting rotational driving power to said engine from said input shaft to said output shaft at various output/input speed ratios;
    a pump casing received within a pressure chamber formed in said main housing and having an internal cam bore;
    a pump rotor mounted on said output shaft for rotation together therewith and received in said internal cam bore;
    side plates urged to be held in contact with both side surfaces of said pump casing and said pump rotor disposed therebetween for enabling said pump casing and said pump rotor to deliver pressurized fluid into said pressure chamber and said outlet passage when said pump rotor is rotated, said pump casing, said pump rotor and said side plates being integrally movable in an axial direction of said output shaft so as to press one of said friction discs toward the other friction disc when pressurized fluid is supplied into said pressure chamber;
    a throttle element provided in said outlet passage;
    an actuator having a movable member whose two separate fluid reactive surfaces are responsive respectively to pressurized fluids which are delivered by the rotation of said pump rotor respectively through and not through said throttle element;
    a speed change mechanism incorporated in said speed converter for changing the transmission ratio of said rotational driving power from said engine to said pump rotor and being operatively connected with said movable member so as to be controllably operated thereby; and
    means cooperating with said actuator for operating said speed change mechanism to maintain approximately constant the pressure difference between fluids before and behind said throttle element.

2. A fluid pump as claimed in claim 1, wherein said means cooperating with said actuator comprises a spring for urging said movable member to move in one direction.

3. A fluid pump as claimed in claim 1, wherein said speed converter is further composed of a plurality of balls provided between said pair of said friction discs in contact therewith for transmitting driving power therebetween, and wherein said speed change mechanism is arranged to tilt the rotational axis of each of said balls when operated by said movable member.

4. A fluid pump as claimed in claim 3, wherein said speed change mechanism comprises:
    a retaining member fixedly provided between said pair of said friction discs;
    a plurality of pivot shafts carried on said retaining member for pivotal movement in respective planes, each including the axis of said input shaft;
    a plurality of rollers respectively rotatably carried on said plurality of said pivot shafts and cooperating with one another to hold said plurality of said balls in contact with said pair of said friction discs; and
    a member engaged with said plurality of said rollers and connected to said movable member so as to pivot said plurality of said pivot shafts when moved by said movable member.

5. A fluid pump as claimed in claim 4, further comprising:
    a plurality of radially movable vanes retained by said pump rotor and urged to contact with an internal cam surface formed on said pump casing.

* * * * *